United States Patent [19]

Masseth et al.

[11] Patent Number: 5,165,729
[45] Date of Patent: Nov. 24, 1992

[54] HOSE CONSTRUCTION, COUPLING UNIT AND SYSTEM THEREFOR AND METHODS OF MAKING THE SAME

[75] Inventors: David A. Masseth, La Habra, Calif.; John D. Sanders, Springfield, Mo.

[73] Assignee: Dayco Products, Inc., Dayton, Ohio

[21] Appl. No.: 798,298

[22] Filed: Nov. 22, 1991

Related U.S. Application Data

[62] Division of Ser. No. 546,157, Jun. 28, 1990, Pat. No. 5,074,599.

[51] Int. Cl.[5] ............................................. F16L 39/04
[52] U.S. Cl. ....................................... 285/39; 285/404
[58] Field of Search ................... 285/39, 90, 81, 404, 285/132; 411/4, 396, 919; 403/11

[56] References Cited

U.S. PATENT DOCUMENTS

| | | | |
|---|---|---|---|
| 3,527,478 | 9/1970 | Enssle | 285/404 X |
| 4,133,350 | 1/1979 | Nelson | 285/90 X |
| 4,540,322 | 9/1985 | Coffia | 411/4 X |
| 4,645,422 | 2/1987 | Brushaber | 411/910 X |
| 4,951,720 | 8/1990 | Grantham | 285/132 X |

Primary Examiner—Dave W. Arola
Attorney, Agent, or Firm—Joseph V. Tassone

[57] ABSTRACT

A hose construction, coupling unit and system therefor and methods of making the same are provided, the hose construction comprising a flexible hose having opposed ends, a tubular member having opposed ends one end of which is carried by one of the ends of the hose and the other end of which extends outboard of the one end of the hose, and an annular coupling unit rotatably carried on the other end of the tubular member outboard of the one end of the hose, the coupling unit having an externally threaded portion for threadedly connecting with an internally threaded coupling device, the coupling unit having an annular portion provided with a tool gripping external peripheral surface for rotating the coupling unit on the tubular member in order to threadedly interconnect the threaded portion with the coupling device, the annular portion being a part that is separate from the threaded portion so as to be adapted to be rotated relative thereto to tend to prevent unthreading of the threaded portion from the coupling device when the annular portion is being rotated relative to the threaded portion.

2 Claims, 3 Drawing Sheets

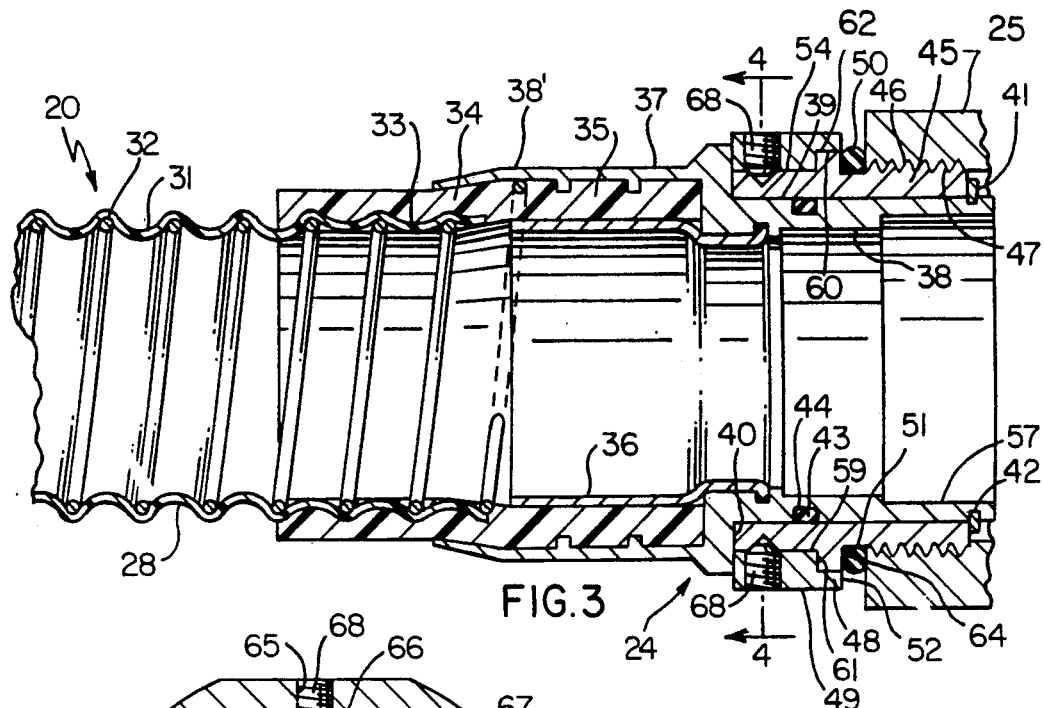
FIG.3
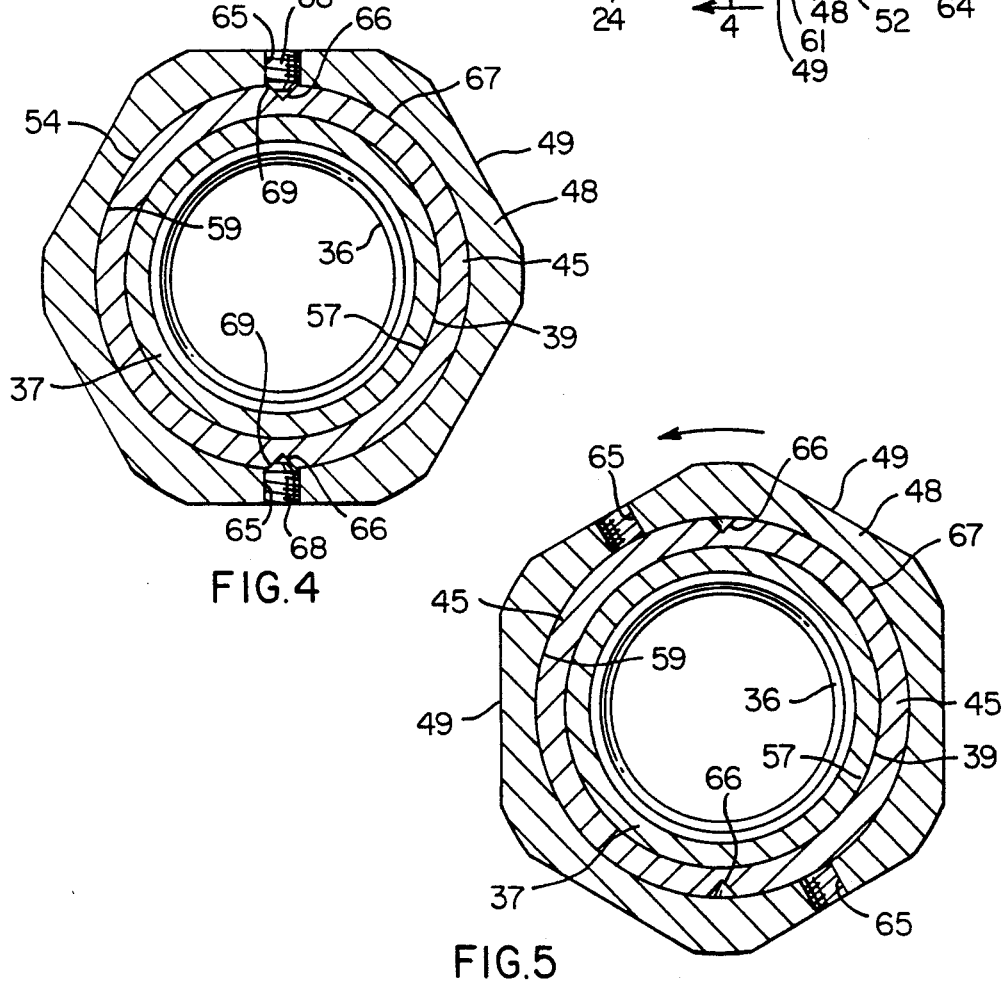
FIG.4
FIG.5

HOSE CONSTRUCTION, COUPLING UNIT AND SYSTEM THEREFOR AND METHODS OF MAKING THE SAME

CROSS REFERENCE TO RELATED APPLICATIONS

This application is a divisional patent application of its copending parent patent application Ser. No. 546,157, filed Jun. 28, 1990, now U.S. Pat. No. 5,074,599.

BACKGROUND OF THE INVENTION

1. Field of the Invention

This invention relates to a new hose construction, a new coupling unit for the hose construction, a system using the hose construction and methods of making the same 2. Prior Art Statement It is known to provide a hose construction comprising a flexible hose having opposed ends, a tubular member having opposed ends one of which is carried by one of the ends of the hose and the other end of which extends outboard of the one end of the hose, and an annular coupling unit rotatably carried on the other end of the tubular member outboard of the one end of the hose, the coupling unit having an externally threaded portion for threadedly connecting with an internally threaded coupling device, the coupling unit having an annular portion provided with a tool gripping external peripheral surface for rotating the coupling unit on the tubular member in order to threadedly interconnect the threaded portion with the coupling device. For example, see the allowed U.S. patent application of Roger P. Grantham, Ser. No. 192,253, filed Apr. 25, 1988.

It is also known to dispose part of a cylindrical tube over the tool gripping peripheral surface of a coupling unit so as to tend to prevent unauthorized uncoupling of the coupling unit from a coupling device.

SUMMARY OF THE INVENTION

It is one feature of this invention to provide a new hose construction wherein the coupling unit thereof has unique means to tend to prevent the unauthorized uncoupling of that coupling unit from its coupling device.

In particular, it is well known that the hose constructions that are utilized to respectively interconnect curbside gasoline pumps with dispensing nozzles for dispensing gasoline into the gasoline tanks of transportation vehicles each has the respective opposed ends thereof provided with externally threaded coupling units for respectively coupling with internally threaded coupling devices of the pump and the dispensing nozzle whereby theft and/or unauthorized removal of such hose constructions have occurred because of the unthreading of the coupling units of the hose constructions from the coupling devices thereof.

Therefore, it was found according to the teachings of this invention that the coupling unit for such a hose construction could be uniquely formed of two parts which can be initially secured together to provide for coupling with the desired coupling device and then be set in a nonsecured manner so that unauthorized unthreading of the coupling unit from its coupling device will tend to be prevented.

For example, one embodiment of this invention provides a hose construction comprising a flexible hose having opposed ends, a tubular member having opposed ends one end of which is carried by one of the ends of the hose and the other end of which extends outboard of the one end of the hose, and an annular coupling unit rotatably carried on the other end of the tubular insert outboard of the one end of the hose, the coupling unit having an externally threaded portion for threadedly connecting with an internally threaded coupling device, the coupling unit having an annular portion provided with a tool gripping external peripheral surface for rotating the coupling unit on the tubular member in order to threadedly interconnect the threaded portion with the coupling device, the annular portion being a part that is separate from the threaded portion so as to be adapted to be rotatable relative thereto to tend to prevent unthreading of the threaded portion from the coupling device when the annular portion is being rotated relative to the threaded portion.

Accordingly, it is an object of this invention to provide a new hose construction having one or more of the novel features of this invention as set forth above or hereinafter shown or described.

Another object of this invention is to provide a new method for such a hose construction, the method of this invention having one or more of the novel features of this invention as set forth above or hereinafter shown or described.

Another object of this invention is to provide a new coupling unit for such a hose construction, the coupling unit of this invention having one or more of the novel features of this invention as set forth above or hereinafter shown or described.

Another object of this invention is to provide a new method of making such a coupling unit, the method of this invention having one or more of the novel features of this invention as set forth above or hereinafter shown or described.

Another object of this invention is to provide a new system utilizing such a hose construction, the system of this invention having one or more of the novel features of this invention as set forth above or hereinafter shown or described.

Another object of this invention is to provide a new method of making such a system, the method of this invention having one or more of the novel features of this invention as set forth above or hereinafter shown or described.

Other objects, uses and advantages of this invention are apparent from a reading of this description which proceeds with reference to the accompanying drawings forming a part thereof and wherein:

BRIEF DESCRIPTION OF THE DRAWINGS

FIG. 3 is an enlarged fragmentary cross-sectional view taken on line 3—3 of FIG. 2 and illustrates the hose construction without the inner produce hose therein and being schematically illustrated as being interconnected to an internally threaded coupling device.

FIG. 4 is a cross-sectional view taken on line 4—4 of FIG. 3.

FIG. 5 is a view similar to FIG. 4 and illustrates the coupling unit after the securing means have been removed therefrom so as to tend to prevent unauthorized uncoupling of the coupling unit thereof.

DESCRIPTION OF THE PREFERRED EMBODIMENT

Figure 1:
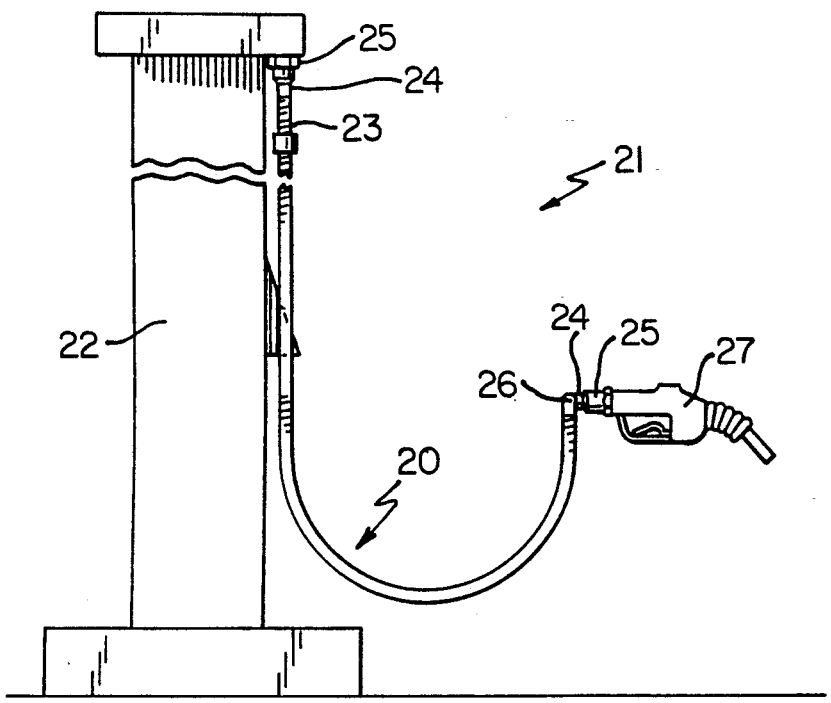
FIG. 1 is a schematic side view illustrating the system of this invention utilizing the hose construction of this invention for interconnecting a curbside gasoline pump with a dispensing nozzle construction.

While the various features of this invention are hereinafter illustrated and described as being particularly adapted to provide a hose construction for a vehicle fuel filling operation wherein the hose construction has a vapor recovery function, it is to be understood that the various features of this invention can be utilized singly or in various combinations thereof to provide a hose construction for other uses as desired.

Therefore, this invention is not to be limited to only the embodiment illustrated in the drawings, because the drawings are merely utilized to illustrate one of the wide variety of uses of this invention.

Figure 2:
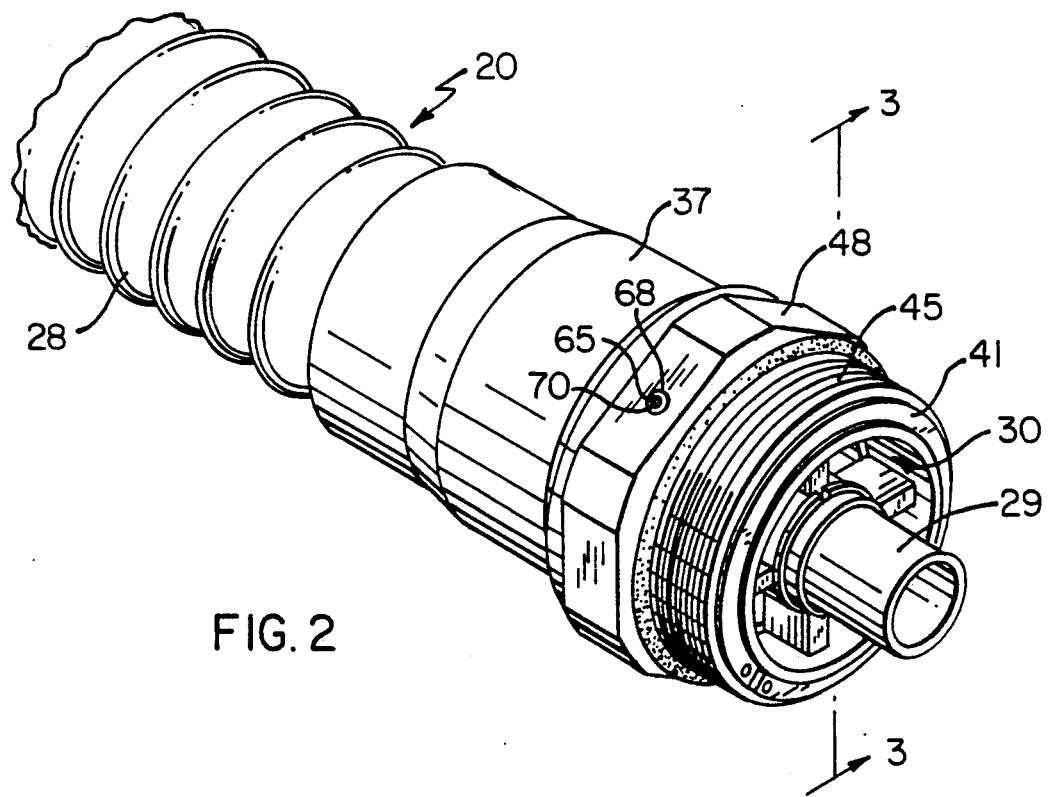
FIG. 2 is an enlarged fragmentary perspective view illustrating one of the opposed ends of the hose construction of FIG. 1.
Figure 6:
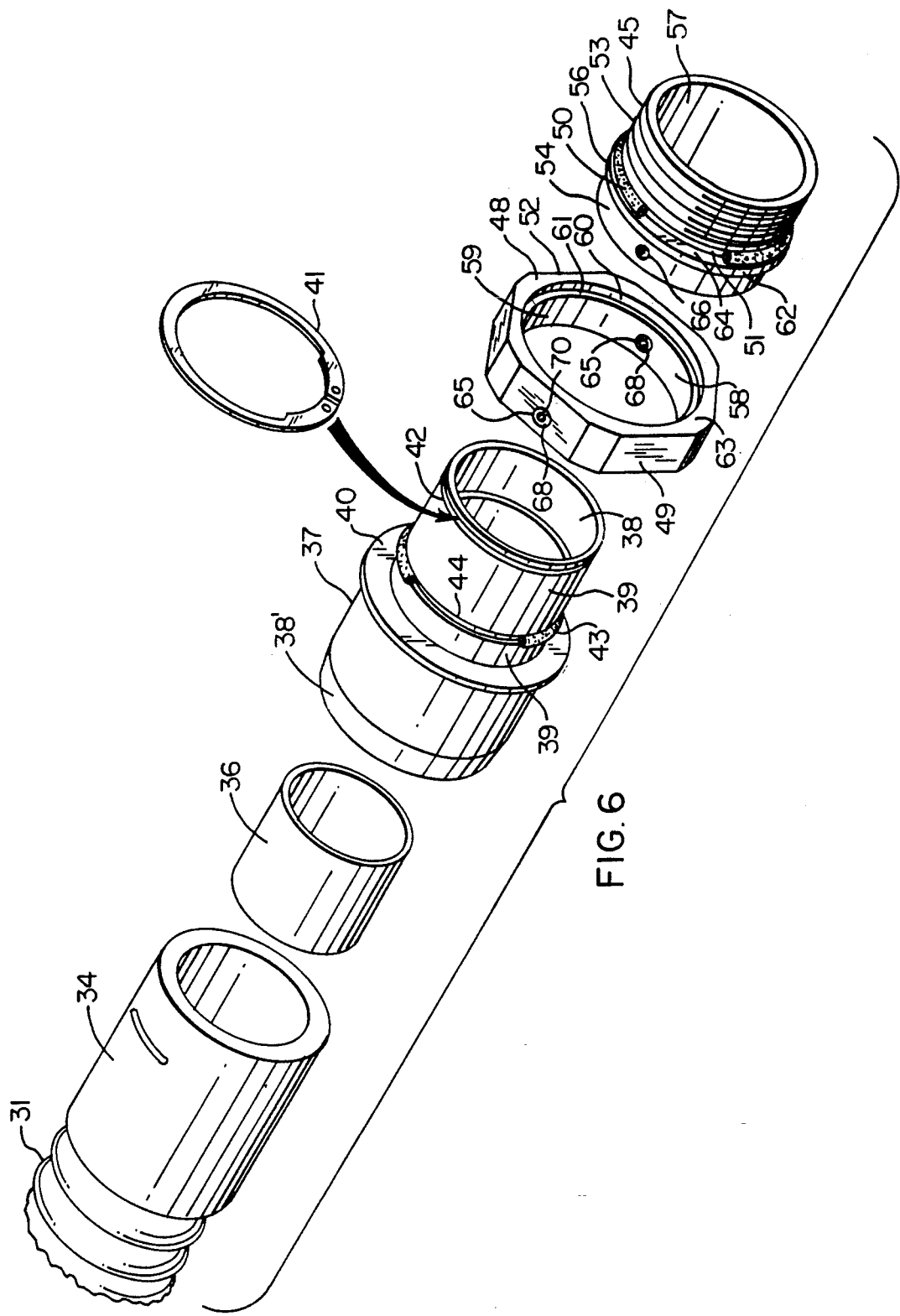
FIG. 6 is a fragmentary exploded perspective view illustrating the various parts of the hose construction of this invention.

Referring now to FIGS. 1 and 2, the new hose construction of this invention is generally indicated by the reference numeral 20 and is illustrated in FIG. 1 as being utilized in a system of this invention that is generally indicated by the reference numeral 21 and that comprises a curbside pump means 22 of a gasoline filling station wherein one end 23 of the hose construction 20 has a coupling unit 24 thereof coupled to a coupling device 25 of the pump means 22 while the other opposed end 26 of the hose construction has its coupling unit 24 coupled to a coupling device 25 of a dispensing nozzle construction 27 that is utilized for dispensing fuel into the gas tank of a transportation vehicle or the like in a manner well known in the art.

In particular, the hose construction 20 of this invention comprises a tubular flexible hose 28 formed mainly of polymeric material and being utilized to be disposed around an inner flexible product hose construction 29 so as to define an annular space 30 therebetween for vapor recovery purposes during the dispensing operation all in a manner fully set forth in the aforementioned allowed U.S. patent application of Roger P. Grantham, Ser. No. 192,253, filed Apr. 25, 1988, whereby this patent application is being incorporated into this disclosure by this reference thereto.

Therefore, since the use of the hose construction 20 with its inner product hose 29 is fully set forth in the aforementioned patent application, no further discussion of the operation and use of the hose construction 20 need be set forth. However, sufficient details of the hose construction 20 to understand the features of this invention will now be set forth.

Referring now to FIG. 3, the hose construction 20 comprises a flexible hose 31 formed mainly of polymeric material and can be provided with a helically disposed reinforcing wire means 32 in the manner illustrated in FIG. 3, the flexible hose 31 having opposed ends of which only the end 33 is illustrated in FIGS. 3-6 with the understanding that the nonshown end of the hose 31 would be formed in a manner similar to the end 33 thereof. However, it is to be understood that the other end of the hose 31 could have structure other than the structure illustrated in FIG. 3, if desired.

As illustrated in FIG. 3, a flexible polymeric cuff 34 is molded or otherwise telescopically disposed on the end 33 of the hose 31 and has a portion 35 extending outboard of the end 33 of the hose 31 and to which is coupled an internal tubular metallic insert 36 and an outer tubular metallic ferrule or member 37 which compresses the portion 35 of the cuff 34 between the ferrule 37 and insert 36 all in a manner well known in the art whereby one end 38' of the tubular ferrule or member 37 is carried by the end 33 of the hose 31 while the other opposed end 38 of the tubular ferrule or member 37 extends outboard of the one end 33 of the hose 31 and has a substantially smooth cylindrical external peripheral surface 39 disposed adjacent an annular and radially disposed shoulder 40 thereof.

In this manner, the coupling unit 24 of this invention is adapted to be telescopically disposed on the end 38 of the tubular member 37 between the shoulder 40 and a split retaining ring 41 that is subsequently disposed in an annular groove 42 that interrupts the external peripheral surface 39, the coupling unit 24 being adapted to be sealed to the external peripheral surface 39 of the end 38 of the tubular member 37 by an annular flexible O-ring 43 that is disposed in an annular groove 44 that interrupts the external peripheral surface 39 of the tubular member 37 in a manner well known in the art. However, the coupling unit 24 is still adapted to be rotated on the end 38 of the tubular member 37 between the shoulder 40 and retaining ring 41 even though being sealed by the O-ring 43 as will be apparent hereinafter.

The coupling device 24 of this invention has an externally threaded portion 45 provided with external threads 46 that are adapted to threadedly couple with internal threads 47 of a coupling device 25 that is carried by the pump means 22 or the dispensing nozzle 27 of the system 21 illustrated in FIG. 1 for the purpose previously set forth.

The coupling unit 24 of this invention has an annular portion 48 provided with a tool gripping external peripheral surface 49 for rotating the coupling unit 24 on the tubular member 37 in order to threadedly interconnect the threaded portion 45 thereof with the coupling device 25 so as to fluidly interconnect the hose construction 20 to the desired structure in the system 21, the external peripheral surface 49 of the annular portion 48 defining a hex-like structure as illustrated in FIG. 4 to facilitate the gripping of the same by an appropriate tool for the threading purpose previously set forth.

In order to fluid seal the coupling unit 24 with the coupling device 25, an annular flexible O-ring 50 is disposed in an annular groove 51 formed in the coupling unit 24 intermediate the threads 46 of the threaded portion 45 and an annular shoulder means 52.

As previously stated, one of the problems of a similar hose construction is that once the coupling unit 24 thereof has been utilized to couple with a coupling device 25, unauthorized personnel have removed such hose constructions 20 by merely unthreading the coupling units 24 thereof from the respective coupling devices 25 by applying suitable tools against the external peripheral surfaces 49 of the annular portions 48 in a reverse unthreading or uncoupling manner.

However, it was found according to the teachings of this invention that the annular portion 48 can be made a part separate from the threaded portion 45 so as to be made to be rotatable relative thereto after the threaded portion 45 has been threadedly interconnected to the coupling device 25 so that rotation of the annular portion 48 thereafter will not cause the threaded portion 45 to unthread from the coupling device 25 in order to tend to prevent unauthorized uncoupling of the hose construction 20 from the coupling device 25.

In particular, the threaded portion 45 of the coupling 24 of this invention is formed with a threaded section 53 and an unthreaded smooth cylindrical section 54 separated from each other by an outwardly directed annular flange 56 that defines part of the annular shoulder means 52 previously set forth as will be apparent hereinafter whereby it can be seen that the sections 53 and 54 of the threaded portion 45 comprise a onepiece member that has an internal peripheral surface 57 adapted to be rotatably disposed on the external peripheral surface 39 of the tubular member 37 to be rotated thereon for a coupling and/or uncoupling operation therewith.

The separate annular portion 48 of the coupling unit 24 of this invention has a stepped internal peripheral surface 58 defined by two annular sections 59 and 60 separated from each other by an annular shoulder means 61, the diameters of the sections 59 and 60 being such that the annular portion 48 is adapted to be telescopically disposed on the unthreaded section 54 of the threaded portion 45 in the manner illustrated in FIG. 3 so that the annular section 59 of the annular portion 48 is disposed for rotatable movement on the unthreaded section 54 of the threaded portion 45 while the section 60 of the annular portion 48 is disposed for rotatable movement on an outer annular peripheral surface 62 of the annular flange 56 of the threaded portion 45 when it is desired to have rotatable movement between the annular portion 48 and the threaded portion 45. In addition, the side surface 63 of the annular portion 48 when telescoped with the threaded portion 45 is disposed substantially flush with an annular side 64 of the flange 56 of the threaded portion 45 so as to define therewith the annular shoulder means 52 of the coupling device 24.

In order to secure the annular portion 48 to the threaded portion 45 so as to cause rotational movement of the threaded portion 45 upon rotational movement of the annular portion 48, the annular portion 48 is provided with one or more internally threaded openings 65 that completely interrupt the external peripheral surface 49 thereof and the internal peripheral section 59 thereof and are adapted to be aligned with indentations or recesses 66 formed in the external peripheral surface 67 of the unthreaded section 54 of the threaded portion 45 as illustrated in the drawings.

In this manner, externally threaded set screws 68 are adapted to be threadedly disposed in the threaded openings 65 of the annular portion 48 and have the conical ends 69 thereof received in the recesses 66 of the threaded portion 45 so as to fasten the annular portion 48 with the threaded portion 45 so that the same will rotate in unison as long as the set screws 68 are in their fully inserted condition as illustrated in FIG. 4.

In this manner, the coupling unit 24 is adapted to be rotated on the end 38 of the tubular member 37 of the hose 31 so as to couple and uncouple the threaded portion 45 from the desired coupling device 25 for the reasons previously set forth by applying a suitable tool to the gripping surface 49 of the annular portion 48 in the usual manner.

However, once the coupling unit 24 is coupled to the desired coupling device 25 and it is desired to tend to prevent unauthorized uncoupling therefrom, the set screws 68 can be removed with a suitable tool being inserted into the particularly shaped openings 70 of the set screws 68 in a manner well known in the art whereby once the set screws 68 have been backed out of the openings 65 and removed therefrom, a person rotating the annular portion 48 with a suitable tool gripping the external peripheral surface 49 thereof for the unauthorized attempt of uncoupling the coupling unit 24 from the coupling device 25 will merely rotate the annular portion 48 on the unthreaded section 54 of the threaded portion 45 without causing any rotation of the threaded portion 45. In addition, that unauthorized person cannot grip in any manner the threaded portion 45 to cause rotation thereof because the annular portion 48 is completely held between the annular flange 56 of the threaded portion 45 and the shoulder 40 of the tubular member 37.

While it is unlikely that the unauthorized person would have set screws that would fit the openings 65 of the annular portion 48 so as to fasten the portions 48 and 45 together, the threaded openings 65 of the annular portion 48 can each be provided with a left-hand thread requiring a left-hand threaded set screw 68 to work therewith which is even a further deterrent means for preventing the unauthorized person to tend to couple the annular portion 48 to the threaded portion 45 for the unauthorized attempt of uncoupling the coupling unit 24 of this invention from the coupling device 25.

Therefore, it can be seen that the service station owner who is utilizing the hose construction 20 of this invention can install the hose construction 20 in the manner previously set forth with the set screws 68 in place and then remove the set screws 68 and maintain the same in a safe place so as to prevent unauthorized removal of the hose construction 20. However the retained set screws 68 will readily permit that station owner to uncouple the hose construction 20 when desired by merely reinserting the set screws 68 into the proper position relative to the recesses 66 in the threaded portion 45 for uncoupling the hose construction 20 from the coupling devices 25 in the manner previously set forth.

While the threaded portion 45 and annular portion 48 of the coupling unit 24 of this invention can be formed of any suitable material, one working embodiment thereof has the portions 45 and 48 each formed of brass and the same can be chrome plated in desired areas thereof in order to prevent galling of the surfaces thereof which are to rotate relative to fixed surfaces in the coupling and uncoupling operations thereof as is well known in the art. In addition, the bearing surfaces can be coated with a suitable lubricant, such as a silicon grease, in order to prevent galling, etc.

In one such working embodiment of the coupling unit 24 of this invention, the set screws 68 have a length of approximately 3/16th of an inch and a left-hand thread of 10-32. The internal diameter of the section 59 of the annular portion 48 is approximately 1.780 of an inch while the width of the annular portion 48 is approximately 0.500 of an inch. The threaded portion 48 of one such working embodiment has a length of approximately 1.110 of an inch with the unthreaded section 54 being approximately 0.400 of an inch, the width of the flange 56 being approximately 0.100 of an inch, and the width of the groove 51 for the O-ring 50 being approximately 0.150 of an inch while the internal peripheral surface 57 has a diameter of approximately 1.600 of an inch.

However, it is to be understood that the above materials and dimensions of the one working embodiment of the coupling unit 24 of this invention is not to be a limitation on this invention as other materials and sizes can be utilized in order to have the coupling unit function in the manner previously set forth.

Therefore, it can be seen that this invention not only provides a new hose construction, but also this invention provides a new system utilizing such a hose construction and a new coupling unit for such a hose construction. In addition, this invention provides new methods of making such a hose construction, such a system and such a coupling unit.

While the forms and methods of this invention now preferred have been illustrated and described as required by the Patent Statute, it is to be understood that other forms and method steps can be utilized and still fall within the scope of the appended claims wherein each claim sets forth what is believed to be known in each claim prior to this invention in the portion of each claim that is disposed before the terms "the improvement" and sets forth what is believed to be new in each claim according to this invention in the portion of each claim that is disposed after the terms "the improvement" whereby it is believed that each claim sets forth a novel, useful and unobvious invention within the purview of the Patent Statute.

What is claimed is:

1. In a fluid supply system comprising an internally threaded coupling device and a hose construction coupled to said device, said hose construction comprising a flexible hose having opposed ends, a tubular member having opposed ends one end of which is carried by one of said ends of said hose and the other end of which extends outboard of said one end of said hose, an annular coupling unit rotatably carried on said other end of said tubular member outboard of said one end of said hose, said coupling unit having an annular surface and having an externally thred portion threadedly connected with said internally threaded coupling device, said coupling unit having an annular portion provided with a tool gripping external peripheral surface for rotating said coupling unit on said tubular member in order to threadedly interconnect said threaded portion with said coupling device, and an annular flexible sealing member telescoped on said coupling unit and being compressed between said annular surface and said device, the improvement wherein said annular portion is a part that is separate from said threaded portion so as to be adapted to be rotatable relative thereto to tend to prevent unthreading of said threaded portion from said coupling device when said annular portion is being rotated relative to said threaded portion, said threaded portion having a smooth cylindrical section and an externally threaded section adjacent thereto, said annular portion having an opening passing therethrough and being telescopically disposed on said smooth section by loosely receiving said smooth section in said opening thereof so as to be adapted to be rotated relative thereto, and removable means for preventing relative rotation between said annular portion and said threaded portion, said threaded portion having an outwardly directed annular flange disposed between said smooth section and said threaded section, said annular flange defining said annular surface, said system having a pump means, said coupling device interconnecting said hose construction to said pump means.

2. In a fluid supply system comprising an internally threaded coupling device and a hose construction coupled to said device, said hose construction comprising a flexible hose having opposed ends, a tubular member having opposed ends one end of which is carried by one of said ends of said hose and the other end of which extends outboard of said one end of said hose, an annular coupling unit rotatably carried on said other end of said tubular member outboard of said one end of said hose, said coupling unit having an annular surface and having an externally threaded portion threadedly connected with said internally threaded coupling device, said coupling unit having an annular portion provided with a tool gripping external peripheral surface for rotating said coupling unit on said tubular member in order to threadedly interconnect said threaded portion with said coupling device, and an annular flexible sealing member telescoped on said coupling unit and being compressed between said annular surface and said device, the improvement wherein said annular portion is a part that is separate from said threaded portion so as to be adapted to be rotatable relative thereto to tend to prevent unthreading of said threaded portion form said coupling device when said annular portion is being rotated relative to said threaded portion, said threaded portion having a smooth cylindrical section and an externally threaded section adjacent thereto, said annular portion having an opening passing therethrough and being telescopically disposed on said smooth section by loosely receiving said smooth section in said opening thereof so as to be adapted to be rotated relative thereto, and removable means for preventing relative rotation between said annular portion and said threaded portion, said threaded portion having an outwardly directed annular flange disposed between said smooth section and said threaded section, said annular flange defining said annular surface, said system having a dispensing nozzle means, said coupling device interconnecting said hose construction to said nozzle means.

* * * * *